(12) United States Patent
Cederblad et al.

(10) Patent No.: US 7,326,659 B2
(45) Date of Patent: Feb. 5, 2008

(54) BIODEGRADABLE NETTING

(75) Inventors: Hans O. Cederblad, Minnetonka, MN (US); Keith E. Misukanis, Eagan, MN (US); Christopher P. Hakanson, Woodbury, MN (US); Andrew J. Thoen, Harris, MN (US)

(73) Assignee: Conwed Plastics LLC, Minneapolis, MN (US)

( * ) Notice: Subject to any disclaimer, the term of this patent is extended or adjusted under 35 U.S.C. 154(b) by 0 days.

(21) Appl. No.: 11/056,715

(22) Filed: Feb. 11, 2005

(65) Prior Publication Data

US 2005/0183329 A1    Aug. 25, 2005

Related U.S. Application Data

(60) Provisional application No. 60/545,228, filed on Feb. 16, 2004.

(51) Int. Cl.
*D04H 1/00* (2006.01)
*B32B 27/12* (2006.01)

(52) U.S. Cl. .................. 442/1; 442/2; 442/38; 442/43; 442/44; 442/46; 442/49; 442/50; 442/58; 47/31; 47/74; 47/78; 523/124; 523/125; 523/126; 523/128

(58) Field of Classification Search .............. 442/1, 442/2, 38, 43, 44, 46, 49, 50, 58; 47/31, 47/74, 78; 523/124, 125, 126, 128
See application file for complete search history.

(56) References Cited

U.S. PATENT DOCUMENTS

| | | |
|---|---|---|
| 2,919,467 A | 1/1960 | Mercer |
| 3,252,181 A | 5/1966 | Hureau |
| 3,700,521 A | 10/1972 | Gaffney |
| 3,723,218 A | 3/1973 | Gaffney |
| 3,767,353 A | 10/1973 | Gaffney |
| 3,791,784 A | 2/1974 | Arechavaleta |
| 4,123,491 A | 10/1978 | Larsen |
| 4,152,479 A | 5/1979 | Larsen |
| 4,190,692 A | 2/1980 | Larsen |
| 4,656,075 A | 8/1987 | Mudge |
| 4,741,442 A | 5/1988 | Slocumb |
| 4,749,306 A | 6/1988 | Demeny et al. |
| 5,080,665 A | 1/1992 | Jarrett et al. |
| 5,142,023 A | 8/1992 | Gruber et al. |
| 5,219,646 A | 6/1993 | Gallagher et al. |
| 5,247,058 A | 9/1993 | Gruber et al. |
| 5,247,059 A | 9/1993 | Gruber et al. |
| 5,252,642 A | 10/1993 | Sinclair et al. |
| 5,258,488 A | 11/1993 | Gruber et al. |
| 5,274,073 A | 12/1993 | Gruber et al. |
| 5,338,822 A | 8/1994 | Gruber et al. |
| 5,357,035 A | 10/1994 | Gruber et al. |
| 5,359,026 A | 10/1994 | Gruber |

(Continued)

*Primary Examiner*—Ula C Ruddock
(74) *Attorney, Agent, or Firm*—Brooks Kushman P.C.

(57) ABSTRACT

The present invention provides a biodegradable extruded netting. The netting comprises a plurality of interconnected strands with at least some of the strands comprising a biodegradable composition comprising polylactic acid polymer and biodegradable plasticizer. In at least one embodiment, at least 10% of the strands are made of the biodegradable composition. The present invention also relates to a method for making biodegradable extruded netting. The method comprises extruding strands of polymeric material to form a netting wherein at least some of the strands are formed of the biodegradable composition.

25 Claims, 1 Drawing Sheet

U.S. PATENT DOCUMENTS

| | | | |
|---|---|---|---|
| 5,412,005 A | 5/1995 | Bastioli et al. | |
| 5,462,980 A | 10/1995 | Bastioli et al. | |
| 5,484,501 A | 1/1996 | Jacobsen, Jr. et al. | |
| 5,484,881 A | 1/1996 | Gruber et al. | |
| 5,536,807 A | 7/1996 | Gruber et al. | |
| 5,545,681 A | 8/1996 | Honkonen | |
| 5,594,095 A | 1/1997 | Gruber et al. | |
| 5,700,901 A | 12/1997 | Hurst et al. | |
| 5,798,436 A | 8/1998 | Gruber et al. | |
| 5,883,199 A | 3/1999 | McCarthy et al. | |
| 5,885,686 A | 3/1999 | Cederblad et al. | |
| 6,028,160 A | 2/2000 | Chandler et al. | |
| 6,096,809 A | 8/2000 | Lorcks et al. | |
| 6,141,993 A | 11/2000 | Whitbeck | |
| 6,204,207 B1 | 3/2001 | Cederblad et al. | |
| 6,231,803 B1 | 5/2001 | Beretta | |
| 6,280,676 B1 | 8/2001 | Cederblad | |
| 6,353,086 B1* | 3/2002 | Kolstad et al. | 528/354 |
| 6,391,420 B1 | 5/2002 | Cederblad et al. | |
| 6,506,873 B1 | 1/2003 | Ryan et al. | |
| 6,573,340 B1 | 6/2003 | Khemani et al. | |
| 6,623,854 B2 | 9/2003 | Bond | |
| 2002/0028857 A1* | 3/2002 | Holy | 523/124 |
| 2002/0125596 A1 | 9/2002 | Cederblad | |
| 2002/0168912 A1 | 11/2002 | Bond et al. | |
| 2002/0182371 A1 | 12/2002 | Soon et al. | |
| 2002/0188041 A1 | 12/2002 | Bond et al. | |
| 2003/0026945 A1 | 2/2003 | Lasko | |
| 2003/0039851 A1 | 2/2003 | Hale et al. | |
| 2003/0091785 A1 | 5/2003 | Howland | |
| 2003/0091808 A1 | 5/2003 | Bond | |
| 2003/0091821 A1 | 5/2003 | Bond | |
| 2003/0092343 A1 | 5/2003 | Bond et al. | |
| 2003/0109605 A1 | 6/2003 | Bond et al. | |
| 2003/0148690 A1 | 8/2003 | Bond et al. | |
| 2003/0166748 A1 | 9/2003 | Khemani et al. | |
| 2003/0166779 A1 | 9/2003 | Khemani et al. | |
| 2003/0168773 A1 | 9/2003 | Beretta | |
| 2003/0180561 A1 | 9/2003 | Kuroki et al. | |
| 2003/0187149 A1 | 10/2003 | Schmidt et al. | |
| 2003/0212180 A1 | 11/2003 | Rietz et al. | |
| 2003/0216492 A1 | 11/2003 | Bowden et al. | |
| 2004/0076821 A1 | 4/2004 | Janssens et al. | |
| 2004/0161622 A1 | 8/2004 | Rosenbaum et al. | |
| 2004/0171719 A1 | 9/2004 | Neivandt et al. | |
| 2004/0248486 A1* | 12/2004 | Hodson | 442/79 |

* cited by examiner

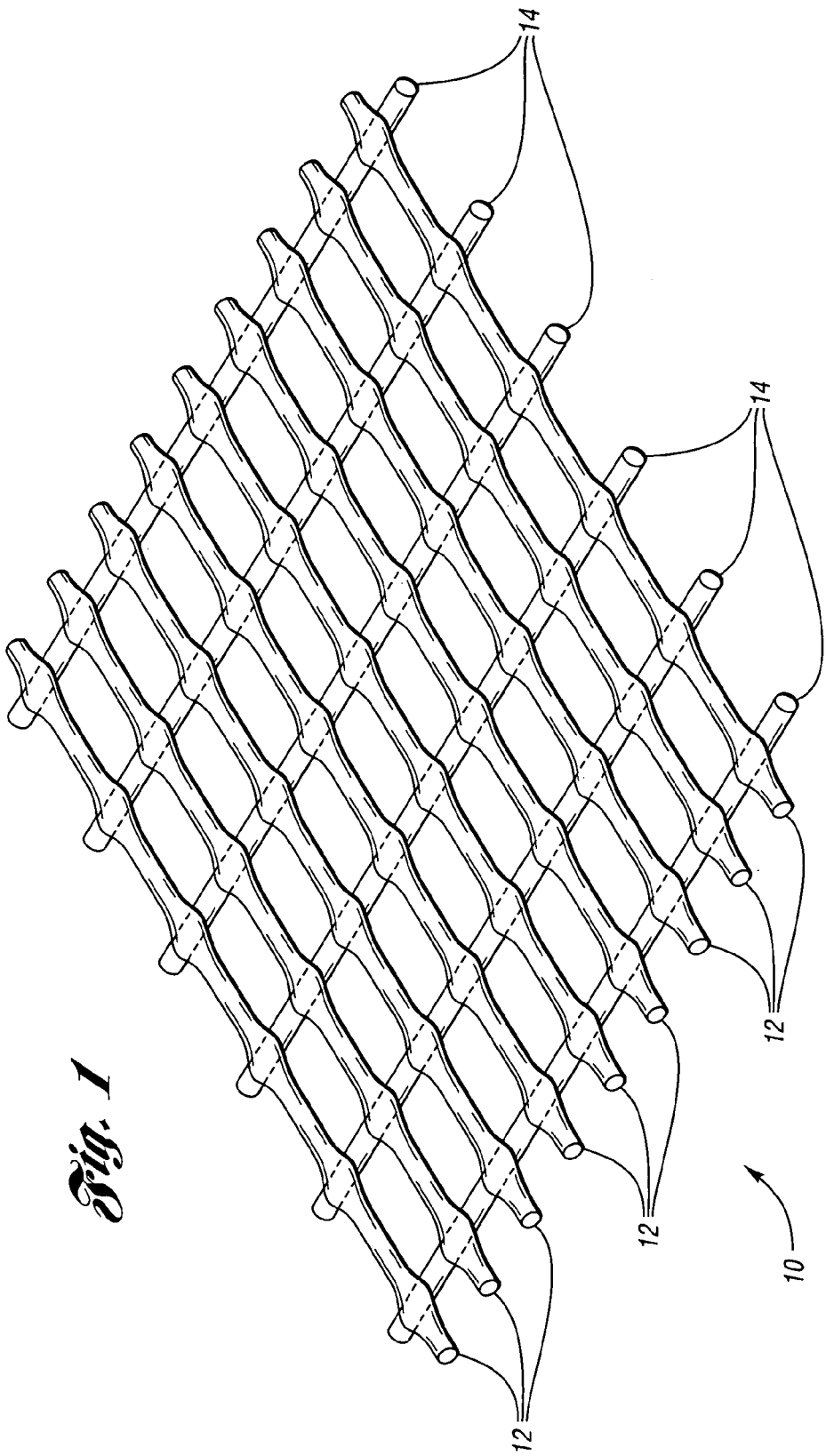

BIODEGRADABLE NETTING

CROSS-REFERENCE TO RELATED APPLICATIONS

This application claims the benefit of U.S. provisional application Ser. No. 60/545,228 filed Feb. 16, 2004.

BACKGROUND OF THE INVENTION

1. Field of the Invention

The present invention relates to biodegradable netting, composites made with the biodegradable netting, and methods for making the same.

2. Background Art

The continuous extrusion of plastic netting started in the 1950's with the process described in U.S. Pat. No. 2,919,467 to Mercer. Extruded netting is netting in which the strands are extruded from a die, the joints therebetween being formed either within the die or immediately outside the die. A variety of configurations are known, such as square, diamond, twill, etc. Some of the more common materials used to prepare extruded netting are polypropylene, polyethylene (including very low, low, medium, high, linear grades, and ethylene copolymers), nylon, polybutylene, and blends thereof.

Currently, the extrusion process of choice for manufacturing plastic nets is one in which individual plastic strands are extruded in an interconnecting network to provide the net-like structure. Methods for practicing this technique are well known. For instance, U.S. Pat. No. 3,700,521; U.S. Pat. No. 3,767,353; U.S. Pat. No. 3,723,218; U.S. Pat. No. 4,123,491; U.S. Pat. No. 4,152,479 and U.S. Pat. No. 4,190,692 show apparatus and method for making nets by the continuous extrusion of individual plastic strands. The disclosures of the above-mentioned issued patents are incorporated by reference into the present application.

These nets have found a number of uses in commerce. For example, these nets have found use as erosion control netting, packaging netting, such as for onion and turkey bags, agricultural netting, such as turf netting, turf wrap, hay bail and netting for industrial, filtration and home furnishings applications.

Netting has also found use in certain composites. In such composites the netting is laminated to one or more fabric overlays. Chief among such uses and composites are fabrics for disposable diapers, incontinent briefs, training pants, bandages, dressings, diaper holders and liners and feminine hygiene garments, medical gowns, medical drapes, mattress pads, blankets, sheets, clothing, consumer wipes and other like products, such as building and construction composites.

Since netting materials often find their way into the environment, either through their implanting as a result of their intended use, or as waste, it has become desirable to provide netting which is biodegradable. A biodegradable plastic material is defined as plastic material that degrades as a result of the action of naturally occurring micro-organisms, such as bacteria, fungi and algae. Complete degradation tends to result in the plastic material being completely transformed into biomass, carbon dioxide and water.

In addition to being biodegradable, the netting must be capable of being made by extrusion. In certain, more common, extruded netting manufacturing processes, plastic netting is typically extruded though an annular die and quenched in a water tank. The resulting tubular netting is collapsed in a quench tank, slit, and opened up to a flat sheet before rewinding. To be compatible with this type of web handling system, the polymer material used in the extruded product must be able to withstand being transformed from an annular tube to a collapsed tube. The material must be flexible enough that this transition does not cause any permanent damage to the netting. The netting's folding point is particularly sensitive to damage (can also affect performance in a subsequent orientation process step). For a given netting material, the greater its thickness, the more susceptible it will be to damage in this transformation process.

PLA polymers are well known biodegradable polymers. However, they are typically high modulus materials. As such, 100% PLA extruded netting, because of its relatively high modulus, does not perform well after extruding in the subsequent web handling and in the orientation portion of the process, thereby making PLA particularly unsuitable for use as an extruded netting material.

Moreover, many extruded biodegradable nettings are subsequently subjected to a process step where it is bi-directionally oriented. To be orientable, the biodegradable material composition must exhibit strain hardening at the orientation temperature, and its stress level in the upper half of the material's strain range must also exceed its yield stress level. In other words, the material must have a break stress higher than the yield stress and exhibit strain between these two stress points. Typically, 100% PLA resins are extrudable, but do not exhibit the above stress-strain relationship, and are therefore not suitable for netting processes that include orientation. For a typical netting extrusion web handling system, the material need to exhibit a certain degree of flexibility, in order for the material not to become damaged by cold stretching when bent or folded.

As such, the material used to make the netting must be able to be extrudable to form netting having desired structural properties, such as flexibility, orientability, tensile strength and biodegradability.

SUMMARY OF THE INVENTION

The present invention provides a biodegradable extruded netting. The netting comprises a plurality of interconnected strands. At least some of the strands comprise a biodegradable composition comprising polylactic acid polymer and biodegradable plasticizer. In at least one embodiment, the biodegradable composition will have a tensile modulus of less than 440,000 psi. Tensile modulus is measured by ASTM: D 638.

In at least one embodiment, at least 10% of the strands are made of the biodegradable composition.

In at least one embodiment, at least 50% of the strands are made of the biodegradable composition.

In at least another embodiment, essentially 100% of the strands are made of the biodegradable composition.

In at least one embodiment, the biodegradable composition comprises 5 to 95 wt. % polylactic acid polymer and 5 to 95 wt. % biodegradable plasticizer.

In at least one embodiment, the polylactic acid polymer has a number average molecular weight (Mn) of 25,000-200,000, a PDI of 1.0-3.5, an MFR of 0.1-50 g/10 min., and a tensile modulus of 475,000 to 750,000.

In at least one embodiment, the biodegradable plasticizer comprises an aliphatic-aromatic copolyester.

In at least another embodiment, the copolyester comprises a diol-dicarboxylic acid condensation-type polyester.

In at least one embodiment, the condensation-type polyester has constitutive components of an aliphatic dicarboxylic acid, an aromatic dicarboxylic acid, and an aliphatic diol.

In at least one embodiment, an amount of polyolefin can be added to the biodegradable composition. In this embodiment, no more then 20 wt. % of the biodegradable composition will comprise polyolefin.

The present invention also relates to a method for making biodegradable extruded netting. The method comprises extruding strands of polymeric material to form a netting with at least a portion of the strands comprising a biodegradable material comprising polylactic acid polymer and biodegradable plasticizer.

BRIEF DESCRIPTION OF THE DRAWINGS

FIG. 1 is perspective view of an embodiment of the netting of the present invention.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figure is not necessarily to scale. However, it is to be understood that the disclosed embodiments are merely exemplary of the invention that may be embodied in various and alternative forms. Therefore, specific details disclosed herein are not to be interpreted as limiting, but merely as a representative bases for the claims and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

The present invention provides a netting 10 as shown in FIG. 1. The netting comprises strands 12 extending in one direction and strands 14 extending in a generally crosswise or transverse direction. The strands are extruded polymeric elongate members which cross and intersect during extrusion to form the net-like structure. In at least one embodiment, the strands 12 and 14 are made of the same material.

In at least another embodiment, strands 12 are made of a different material than strands 14. In this embodiment, the netting may comprise 10 to 90 wt. % of the material comprising strands 12 and 10 to 90 wt. % of the material comprising strands 14. In other embodiments, the netting may comprise 35 to 65 wt. % of the material comprising strands 12 and 35 to 65 wt. % of the material comprising strands 14. In yet other embodiments, the netting may comprise 45 to 55 wt. % of the material comprising strands 12 and 45 to 55 wt. % of the material comprising strands 14.

In embodiments where the strands 12 and 14 are made of the same material, the material comprising the strands 12 and 14 is a biodegradable material. When a material other then the biodegradable material is used to manufacture one of the sets of strands 12 or 14, such material may comprise a non-, or lesser, biodegradable material. Any such suitable other material could be used such as elastomeric materials such as styrenic block copolymers, Hytrel®, and Santoprene® and polyurethane, polyester, and polyamide thermoplastic elastomers. The other (i.e., non-biodegradable) material may also comprise non-elastomeric materials such as nylons, polyesters, polypropylene, polyethylenes including HDPE and copolymers of such resins, with the polyolefins being preferred and with polypropylene being especially preferred.

In certain embodiments, the biodegradable composition comprises polylactic acid polymer and biodegradable plasticizer. The biodegradable composition may also comprise polyolefinic materials such as polyethylene or polypropylene. Furthermore, the biodegradable composition may also comprise conventional additives. In at least one embodiment, the biodegradable composition may comprise 5% to 100% polylactic acid polymer and 5% to 100% biodegradable plasticizer, and in at least another embodiment 50% to 100% polylactic acid polymer and 10% to 60% biodegradable plasticizer.

In certain embodiments, the biodegradable composition comprises:

| Components | Preferred Range | More Preferred Range | Most Preferred Range |
|---|---|---|---|
| Polylactic Acid Polymer | 5% to 95% | 50% to 95% | 80% |
| Biodegradable Plasticizer | 5% to 95% | 10% to 60% | 20% |
| Polyolefin | 0% to 20% | 0% to 10% | 0% |
| Additives | 0% to 20% | 0% to 10% | <1% |

In general, the polylactic acid polymer can comprise polylactide or polylactic acid (polylactide and polylactic acid being referred to, collectively, herein as polylactide or PLA).

In general, polymer nomenclature sometimes references polymers on the basis of the monomer from which the polymer is made, and in other instances characterizes the polymer based upon the smallest repeating unit found in the polymer. For example, the smallest repeating unit in polylactide is lactic acid (actually residues of lactic acid). However, in typical instances, commercial polylactide will be manufactured by polymerization of lactide monomer, rather than lactic acid. Lactide monomer, of course, is a dimer of lactic acid. Herein the terms "polylactic acid," "polylactide," and "PLA" are intended to include within their scope both polylactic acid-based polymers and polylactide based polymers, with the terms used interchangeably. That is, the terms "polylactic acid," "polylactide," and "PLA" are not intended to be limiting with respect to the manner in which the polymer is formed.

The term "polylactide based" polymer or "polylactic acid based" polymer is meant to refer to polymers of polylactic acid or polylactide, as well as copolymers of lactic acid or lactide, wherein the resulting polymer comprises at least 50%, by weight, lactic acid residue repeating units or lactide residue repeating units. In this context, the term "lactic acid residue repeating unit" is meant to refer to the following unit:

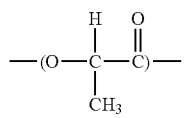

In view of the above definition, it should be clear that polylactide can be referred to both as a lactic acid residue containing polymer and as a lactide residue containing polymer. Herein the term "lactide residue repeating unit" is meant to refer to the following repeating unit:

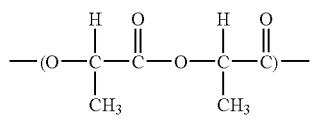

It should be appreciated that the lactide residue repeating unit can be obtained from L-lactide, D-lactide, and meso-lactide. The L-lactide is structured from two S-lactic acid residuals; the D-lactide is structured from two R-lactic acid residuals; and the meso-lactide is structured from both an S-lactic acid residual and an R-lactic acid residual.

Furthermore, it should be understood that the term "PLA" is not intended to limit a composition to one containing only polylactide or polylactic acid as the polymer component. As used herein, the term "PLA" covers compositions which contain a polymer containing the above-described lactic acid residue repeating unit in an amount of at least 50%, by weight, based on the total repeating units in the polymer. A PLA composition can include other components blended in with the polymer containing at least 50%, by weight, lactic acid repeating units. Generally, it is expected that at least 20% of the component will be comprised of a polylactide material. Preferably, the component will include at least 70% by weight polylactide, and more preferably at least 90% by weight polylactide, and even more most preferably 100%. It should be appreciated that the amount of polylactide present in a particular component depends on the desired property to be imparted to that component.

Useable PLA-based polymers according to the preferred techniques described herein, are prepared from polymerization of lactide or lactic acid. In some applications, the polymerization may be a copolymerization, with the lactide or lactic acid monomer copolymerized with another material. In some instances, the lactic acid or lactate may first be polymerized, with the resulting polymer mixture then being reacted, for example copolymerized, with another material in order to provide for some desired modification, for example relating to molecular weight or polydispersity.

Lactic acid residue containing polymers are particularly preferred for use in the present invention due to their hydrolyzable and biodegradable nature. One should recognize that polymers which provide similarly rapid degradation to naturally occurring end products can be useful in the present invention.

U.S. Pat. No. 5,142,023 issued to Gruber et al. on Aug. 25, 1992, the disclosure of which is hereby incorporated by reference, discloses, generally, a continuous process for the manufacture of lactide polymers from lactic acid. Related processes for generating purified lactide and creating polymers therefrom are disclosed in U.S. Pat. Nos. 5,247,058; 5,247,059; and 5,274,073 issued to Gruber et al., the disclosures of which are hereby incorporated by reference. It should be appreciated that selected polymers from these patents having the physical properties suitable for use in the present invention can be utilized. Generally, polymers according to U.S. Pat. No. 5,338,822 issued to Gruber et al. on Aug. 16, 1994 and U.S. Pat. No. 5,594,095 issued to Gruber et al. on Jan. 14, 1997, which are incorporated by reference, can be used in the present invention. Exemplary lactic acid residue containing polymers which can be used are described in U.S. Pat. Nos. 5,142,023; 5,274,059; 5,274,073; 5,258,488; 5,357,035; 5,338,822; 5,359,026; 5,484,881; 5,536,807; and 5,594,095, to Gruber et al., the disclosures of which are incorporated herein by reference.

It is desirable to provide the polylactide polymer with desired molecular weight ranges, PDI, MFR, tensile modulus and tensile strength. It should be appreciated that each of these, and other, properties can be adjusted for a given application.

In at least one embodiment, the polylactide polymer has a number average molecular weight (Mn) of between 25,000 and 200,000. In other embodiments, the number average molecular weight is between 75,000 and 150,000, and in yet other embodiments between 100,000 and 125,000. The measurement of number average molecular weight is preferably accomplished by GPC using polystyrene standards as described, for example, in U.S. Pat. No. 5,338,822.

In at least one embodiment, the polylactide polymer has a weight average molecular weight (Mw) of between 100,000 and 500,000. In other embodiments, the weight average molecular weight is between 125,000 and 250,000, and in yet other embodiments between 175,000 and 225,000. The measurement of weight average molecular weight is preferably accomplished by GPC using polystyrene standards as described, for example, in U.S. Pat. No. 5,338,822.

The polydispersity index (PDI) of the polylactide polymer is generally a function of branching or crosslinking and is a measure of the breadth of the molecular weight distribution. In certain embodiments the PDI (Mw/Mn) of the polylactide polymer is between 1.0 and 3.5, in other embodiments between 1.5 and 2.50, and in yet other embodiments between 1.7 and 2.25. Of course, increased bridging or crosslinking may increase the PDI.

Furthermore, the melt flow rate (MFR) of the polylactide polymer can be measured using standard ASTM: D 1238, condition E, melt flow testing procedures which is at 190° C. with a 2.16 Kg weight. In certain embodiments the polymer has a melt flow rate between 0.1 and 50 g/10 min., in other embodiments, between 0.5 and 25 g/10 min., in yet other embodiments between 1 and 15 g/10 min., in still yet other embodiments between 1 and 12 g/10 min., and in still yet another embodiment between 4 and 12 g/10 min.

In at least one embodiment, the polylactide polymer has a tensile modulus of between 475,000 and 750,000 psi. In other embodiments, the tensile modulus is between 480,000 and 600,000, and in yet other embodiments between 500, 000 and 575,000. The measurement of tensile modulus is preferably accomplished by a tensile test in accordance with ASTM: D 638.

In at least one embodiment, the polylactide polymer has a tensile strength at break of between 1,500 and 15,000 psi. In other embodiments, the tensile strength is between 4,000 and 10,000, and in yet other embodiments between 6,000 and 9,000. The measurement of tensile strength is preferably accomplished by ASTM: D 882.

Suitable polylactic acid polymers include, but not necessarily limited to NatureWorks™ from Cargill Dow, LACEA from Mitsui Chemicals and Lacty from Shimadzu Seisakusho. In certain embodiments, polylactic acid polymers comprise PLA NatureWorks™ 5729B, 2002D, and 5040D available from Cargill Dow. Suitable PLA NatureWorks™ materials may have the following characteristics:

Avg. Mw=197,500+/−5,400
Avg. Mn=106,000+/−5,100
PDI=Mw/Mn=1.86+/−0.10
Melt flow rate=9.6+/−1.4 g/10 min.
Tensile yield=8,700 psi according to ASTM: D 882.
Tensile strength at break=7,700 psi according to ASTM: D 882.
Tensile modules=536,000 according to ASTM: D 638.

Other suitable PLA materials may have MFR's in the 4-8 g/10 min. range.

The biodegradable plasticizer is a biodegradable material combinable with the polylactic acid polymer in order to reduce the compound's tensile modulus and improve its flexibility. In at least certain embodiments, the biodegradable plasticizer can comprise one or more biodegradable copolyesters, such as biodegradable aliphatic-aromatic copolyesters, one or more biodegradable plasticizing oils, one or more other plasticizers that can plasticize polylactic acid polymer, and mixtures thereof. The biodegradable plasticizer can be a relatively low molecular weight material, such as a biodegradable processing oil or a relatively high molecular weight material such as a biodegradable aliphatic-aromatic copolyesters. In the latter case, the composition could be described as a polymer alloy, where the aliphatic-aromatic copolyester contribute plasticizing properties. In at least one embodiment, biodegradable aliphatic-aromatic copolyester is preferred.

In at least one embodiment, the biodegradable aliphatic-aromatic copolyester comprises a diol-dicarboxylic acid condensation-type polyester having constitutive components of an aliphatic dicarboxylic acid, an aromatic dicarboxylic acid, and an aliphatic diol. In the diol-dicarboxylic acid condensation-type polyester having constitutive components of an aliphatic dicarboxylic acid, an aromatic dicarboxylic acid and an aliphatic diol, the dicarboxylic acid-derived structural units for the repetitive units to constitute the molecule of the polyester include those of aliphatic dicarboxylic acids, aromatic dicarboxylic acids and their mixtures. In the polyester, the diol-derived structural units include those of aliphatic diols and their mixtures. Regarding the starting materials for the polymer, the diols are, for example, aliphatic diols having from 2 to 10 carbon atoms. Concretely, they include ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, tetramethylene glycol, and 1,4-cyclohexanedimethanol. These may be used either singly or as combined.

The dicarboxylic acids for use herein may be aromatic and/or aliphatic dicarboxylic acids. The aromatic dicarboxylic acid includes phthalic acid, isophthalic acid, and terephthalic acid. Preferred examples of the aliphatic dicarboxylic acids are oxalic acid, succinic acid, malonic acid, glutaric acid, adipic acid, pimelic acid, suberic acid, azelaic acid, undecane-diacid, dodecane-diacid, and their anhydrides. The dicarboxylic acids may be mixed with their anhydrides, and they may be used either singly or as combined.

For the constitutive components of the diol-dicarboxylic acid condensation-type polyester having the constitutive components of such an aliphatic dicarboxylic acid, an aromatic dicarboxylic acid and an aliphatic diol, it is desirable that the diol is 1,4-butanediol and the dicarboxylic acids are adipic acid and terephthalic acid. Regarding the dicarboxylic acid units in the polyester, it is more desirable that the adipic acid-derived structural units account for from 10 to 90 mol % and the terephthalic acid-derived structural units for from 10 to 90 mol %, based on the number of mols of all the diol-derived structural units in the molecule.

In certain embodiments, the weight average molecular weight (Mw) of the diol-dicarboxylic acid condensation-type polyester that has such constitutive components of an aliphatic dicarboxylic acid, an aromatic dicarboxylic acid and an aliphatic diol is as high as possible within the moldable range thereof, more preferably falling between 30,000 and 1,000,000, in other embodiments 50,000 and 750,000, and in yet other embodiments 100,000 and 500,000.

In certain embodiments the diol-dicarboxylic acid condensation-type polyester has a melt flow rate between 0.5 and 35.0 g/10 min., in other embodiments, between 1.0 and 15.0 g/10 min., and in yet other embodiments between 3.0 and 7.0 g/10 min.

In at least one embodiment, the diol-dicarboxylic acid condensation-type polyester has a tensile modulus of between 1,000 and 75,000 psi. In other embodiments, the tensile modulus is between 5,000 psi and 35,000 psi, and in yet other embodiments between 10,000 psi and 20,000 psi as measured according to ASTM: D 638.

In at least one embodiment, the diol-dicarboxylic acid condensation-type polyester has a tensile strength of between 1,000 and 12,000 psi, as measured according to ISO-527. In other embodiments, the tensile strength is provided between 2,000 and 7,500, in other embodiments between 3,000 and 6,000, and in yet other embodiments between 4,000 and 5,500 psi.

The diol-dicarboxylic acid condensation-type polyester for use in the invention, which has constitutive components of an aliphatic dicarboxylic acid, an aromatic dicarboxylic acid and an aliphatic diol, may be a resin available on the market. One example of the commercially-available resin for the polyester is Eastar Bio® poly (tetramethylene adipate-co-terephthalate) available from Eastman Chemical. Another example is Ecoflex® available from BASF.

Other suitable polyesters that can be used include, but are not necessarily limited to, Biomax® from DuPont, and Bionolle from Showa Highpolymer Co., Ltd.

Suitable polyolefins include polypropylene or polyethylene. In one embodiment, a particularly preferred polypropylene comprises Pro-Fax available from Basell of Elkton, Md. In another embodiment, a particularly preferred polyethylene comprises Exxon Mobil LD-Series, available from Exxon Mobil of Houston, Tex.

Suitable additives include processing aids and antioxidants as well as slip and antiblock. Examples of these additives include Dynamar 5911 and Irganox 1076.

The biodegradable composition can be made by any conventional process for forming these types of compositions. These processes include, but are not necessarily limited to, compounding. Generally, suitable methods for making the composition comprise compounding, either as a separate operation using a twin-screw extruder (preferred method in at least one embodiment), or in-line compounding using a single-screw extruder equipped with a screw that feature good distributive and dispersive mixing characteristics.

In at least one embodiment, the biodegradable composition has a tensile modulus of less than 440,000 psi and in other embodiments between 200,000 and 440,000 psi, as measured in accordance with ASTM: D 638. In other embodiments, the tensile modulus is between 275,000 and 425,000 psi, and in yet other embodiments between 350,000 and 410,000 psi.

The extruded netting can be made by any conventional netting extrusion process. Suitable examples of these processes are set forth in the Background of the Invention, herein. Generally, suitable methods for making the netting comprises extruding the biodegradable composition through dies with reciprocating or rotating parts to form the netting configuration. This creates cross machine direction strands that cross the machine direction strands, which flow continuously. Of course, it should be understood that the biodegradable composition could be used to form both the cross machine direction strands and the machine direction strands, or one or part of the strands, in which case, another material such as another biodegradable composition or an elastomeric material such as Kraton®, could be used to form the other strands. After the extrusion, the netting is then typically stretched in the machine direction using a differential between two sets of nip rollers. After this, the material is then typically stretched in the cross direction using a tentor frame. It should be understood, that the above described method is just one of many suitable methods that can be employed to manufacture extruded netting in accordance with the present invention.

In at least one embodiment, the extruded netting has a basis weight of between 0.3 to 1000 lbs./1000 square feet, in other embodiments between 1 to 100 lbs./1000 square feet, and in yet other embodiments 10 to 50 lbs./1000 square feet, as measured in accordance with ASTM: D 3776.

In at least one embodiment, the extruded netting has a machine direction tensile to break strength of 0.5 to 100 lbs./strand, in other embodiments between 1 to 25 lbs./strand, and in yet other embodiments 2 to 15 lbs./strand.

In at least one embodiment, the extruded netting has a cross direction tensile to break strength of 0.5 to 100 lbs./strand, in other embodiments between 1 to 25 lbs./strand, and in yet other embodiments 2 to 15 lbs./strand.

In at least one embodiment, the extruded netting has a machine direction strands per inch (i.e., strand count) of 0.1 to 50 strands/inch, in other embodiments 0.5 to 25 strands per inch, and in yet other embodiments 1 to 10 strands/inch.

In at least one embodiment, the extruded netting has a cross direction strands per inch of 0.1 to 50 strands/inch, in other embodiments 0.5 to 25 strands/inch, and in yet other embodiments 1 to 6 strands per inch.

In some embodiments, the extruded netting has strands that have an average thickness (i.e., diameter) of 1 to 300 mils, in other embodiments 10 to 50 mils, and in yet other embodiments 15 to 40 mils.

The netting made in accordance with the present invention has many potential uses. Particularly, the properties of the netting make the netting of the invention particularly suitable for use as sod net, sod wrap, hay bale wrap, and erosion control applications. One suitable use will be in the erosion control area. Particularly, the netting may be used to hold blankets of straw, excelsior, coconut and other adsorbent fibers together while brush is allowed to grow and prevents runoff during the early stage of growth.

The netting can also be used to form other types of composites wherein the netting is secured to at least one or more layers of material. Examples of such composites include consumer wipes, reinforced tissue towels, and erosion control composites.

The present invention may be further appreciated by consideration of the following, non-limiting examples, and certain benefits of the present invention may be further appreciated by the examples set forth below.

EXAMPLES

Example 1

An extruded netting is produced at a basis weight of 220 gsm (grams/m$^2$) and a total width of 44.5 inches. The biodegradable raw material composition is 70.0% NatureWorks™ 5040D polylactic acid resin from Cargill Dow, and 30.0% Eastar Bio Ultra aliphatic-aromatic polyester from Eastman Chemical. The extruded netting's machine direction (MD) breaking load is 4.0 lbs/strand, and its cross direction (CD) breaking load is 4.5 lbs/strand.

The extruded netting is subsequently biaxially oriented by first stretching the extruded netting in the machine direction at a temperature of 200° F. The netting is then immediately stretched in the cross direction at a temperature of 120-175° F. The resulting biaxially oriented netting has 1.3 strands per inch in the MD and 0.6 strands per inch in the CD. The average MD breaking load is 4.25 lbs/strand, and the average CD breaking load is 4.5 lbs/strand.

The oriented netting is then tested for aerobic biodegradation under controlled composting conditions according to ASTM: D 5338:98. In a validated test, this netting shows complete biodegradation (103%) after 90 days.

Example 2

An extruded netting is produced at a basis weight of 220 gsm and a total width of 49.5 inches. The biodegradable raw material composition is 64.7% NatureWorks™ 5040D polylactic acid resin from Cargill Dow, 27.8% Eastar Bio Ultra aliphatic-aromatic polyester from Eastman Chemical, and 7.5% of a polypropylene homopolymer. The extruded netting's machine direction (MD) breaking load is 4.0 lbs/strand, and its cross direction (CD) breaking load is 4.5 lbs/strand.

The extruded netting is subsequently biaxially oriented by first stretching the extruded netting in the machine direction at a temperature of 200° F. The netting is then immediately stretched in the cross direction at a temperature of 120-175° F. The resulting biaxially oriented netting has 1.3 strands per inch in the MD and 0.6 strands per inch in the CD. The average MD breaking load is 4.25 lbs/strand, and the average CD breaking load is 4.5 lbs/strand.

The oriented netting is then tested for aerobic biodegradation under controlled composting conditions according to ASTM: D 5338:98. In a validated test, this netting shows complete biodegradation (96%) after 90 days.

Example 3

An extruded netting is produced at a basis weight of 220 gsm and a total width of 42.0 inches. The biodegradable raw material composition is 80.0% NatureWorks™ 5729B polylactic acid resin from Cargill Dow, and 20.0% Ecoflex F BX 7011 aliphatic-aromatic polyester from BASF. The extruded netting's machine direction (MD) breaking load is 4.0 lbs/strand, and its cross direction (CD) breaking load is 4.5 lbs/strand.

The extruded netting is subsequently biaxially oriented by first stretching the extruded netting in the machine direction at a temperature of 200° F. The netting is then immediately stretched in the cross direction at a temperature of 120-175° F. The resulting biaxially oriented netting has 1.3 strands per inch in the machine direction and 0.6 strands per inch in the cross direction. The average MD breaking load is 4.25 lbs/strand, and the average CD breaking load is 4.5 lbs/strand.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A biodegradable extruded netting, said netting comprising a plurality of oriented interconnected extruded strands that intersect during extrusion, at least some of the strands comprising a biodegradable composition comprising polylactic acid polymer and biodegradable plasticizer.

2. The netting of claim 1 wherein at least 50% of the strands are made of the biodegradable composition.

3. The netting of claim 1 wherein essentially 100% of the strands are made of the biodegradable composition.

4. The netting of claim 1 wherein the biodegradable composition comprises 5 to 95 weight percent polylactic acid polymer and 5 to 95 weight percent biodegradable plasticizer.

5. The netting of claim 1 wherein the biodegradable composition comprises 50 to 95 weight percent polylactic acid polymer and 10 to 60 weight percent biodegradable plasticizer.

6. The netting of claim 5 wherein the biodegradable composition has a tensile modulus of 200,000 to 440,000 psi, as measured in accordance with ASTM: D 638.

7. The netting of claim 5 wherein the polylactic acid polymer has a tensile modulus of 475,000 to 750,000 psi, as measured in accordance with ASTM: D 638.

8. The netting of claim 7 wherein the polylactic acid polymer has a number average molecular weight of 25,000 to 200,000.

9. The netting of claim 5 wherein the biodegradable plasticizer comprises biodegradable polyester.

10. The netting of claim 9 wherein the biodegradable polyester comprises a biodegradable aliphatic-aromatic copolyester.

11. The netting of claim 10 wherein the biodegradable polyester comprises a diol-dicarboxylic acid condensation-type polyester.

12. The netting of claim 11 wherein the diol-dicarboxylic acid condensation-type polyester contain constitutive components of an aliphatic dicarboxylic acid, an aromatic dicarboxylic acid, and an aliphatic diol, wherein the polyester has a tensile modulus of 1,000 to 75,000 psi, as measured according to ASTM: D 638, and a weight average molecular weight of 100,000 to 500,000.

13. The netting of claim 1 further comprising an amount of polyolefin present in an amount of no more than 20 weight percent.

14. A composite, said composite comprising:
the netting of claim 1, the netting having a first side and a second side, opposite the first side; and
a first layer of material secured to the first side of the netting.

15. The composite of claim 14 further comprising a second layer of material secured to the second side of the netting.

16. The netting of claim 1 wherein the netting comprises an erosion control netting.

17. The netting of claim 1 wherein the netting comprises a hay bale wrap netting.

18. The netting of claim 1 wherein the biodegradable netting is biaxially oriented after extrusion.

19. The netting of claim 1 wherein the netting has a basis weight of 10 to 50 lbs./1000 square feet.

20. The netting of claim 19 wherein the oriented interconnected strands are biaxially oriented.

21. The netting of claim 19 wherein the netting has a machine direction tensile to break strength of 1 to 25 pounds/strand.

22. The netting of claim 21 wherein the netting has a cross direction tensile to break strength of 1 to 25 pounds/strand.

23. The netting of claim 1 wherein the strands of the netting have an average thickness of 10 to 50 mils.

24. The netting of claim 23 wherein the netting has a machine direction strand per inch of 1 to 10 strands/inch and a cross direction strand per inch of 1 to 6 strands/inch.

25. A biodegradable extruded netting, said netting comprising a plurality of interconnected extruded strands that intersect during extrusion, at least some of the strands comprising a biodegradable composition having a tensile modulus of 200,000 to 440,000 psi and comprising 5 to 95 weight percent polylactic acid polymer and 5 to 95 weight percent biodegradable aliphatic-aromatic copolyester plasticizer, when the polymer has a tensile modulus of 475,000 to 750,000 psi and the plasticizer has a tensile modulus of 1,000 to 75,000 psi.

* * * * *